June 8, 1937. E. C. BRISBANE ET AL 2,082,940
FLUID CONTROL MEANS
Filed Oct. 24, 1936
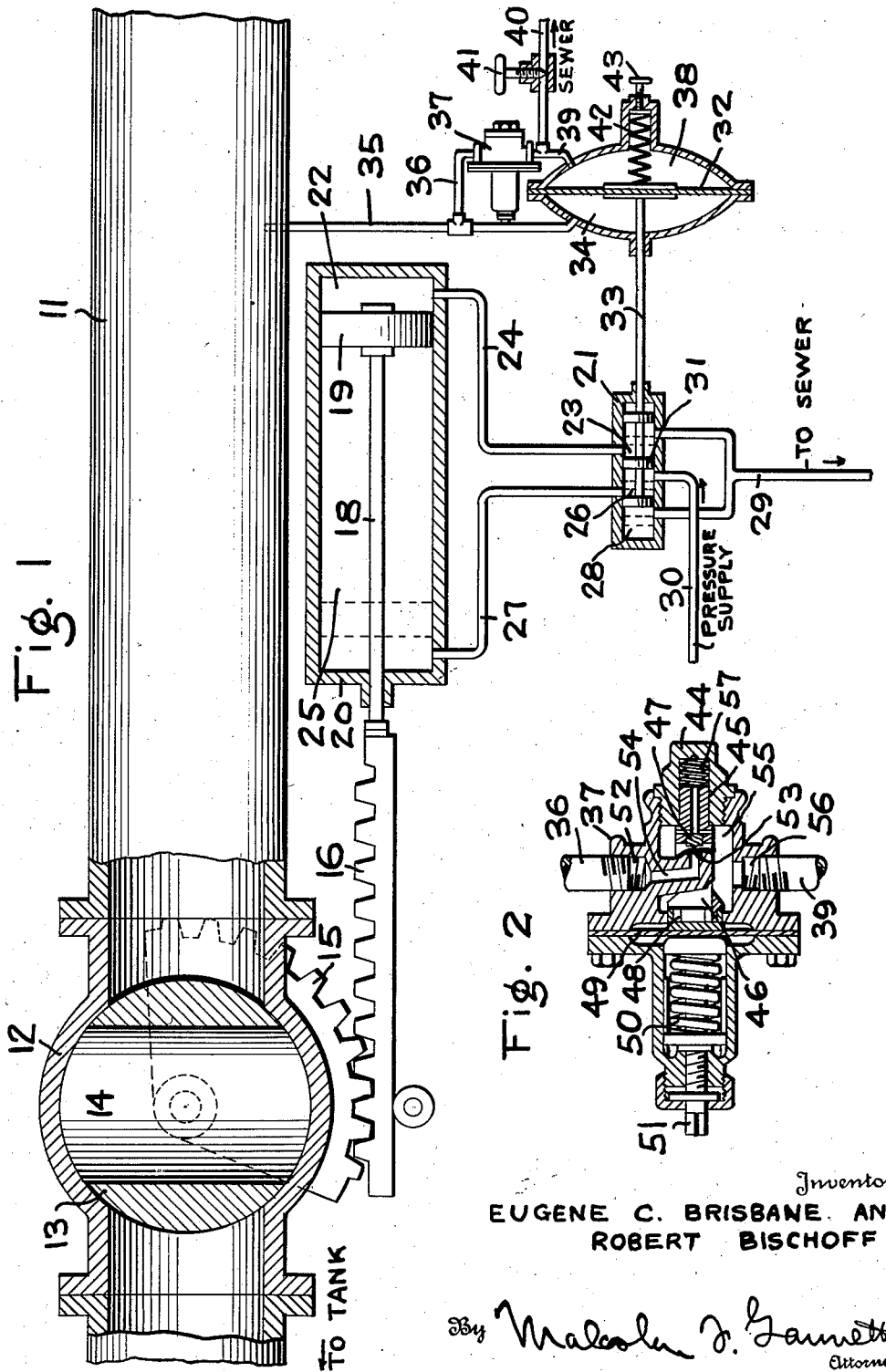
Inventors
EUGENE C. BRISBANE AND
ROBERT BISCHOFF Patented June 8, 1937

2,082,940

UNITED STATES PATENT OFFICE 2,082,940

FLUID CONTROL MEANS

Eugene C. Brisbane, Denver, Colo., and Robert Bischoff, York, Pa., assignors to S. Morgan Smith Company, York, Pa., a corporation of Pennsylvania Application October 24, 1936, Serial No. 107,394

3 Claims. (Cl. 50—10)

This invention relates to fluid control means.

Usually a municipal water supply system includes a plurality of water mains or pipes, which lead from a source of supply, such as a reservoir or the like. In order to maintain the pressure of the water in the mains or pipes up to the desired amount, one or more pumps may be employed. Also, at some point in the water mains there may be one or more water tanks or stand pipes.

Under normal conditions the pumps take care of the supply of water in the pipes or mains. However, in case of excessive use of water, such as at the time of fires, etc., the capacity of the pumps is not equal to the amount of water drawn from the mains, and, therefore, extra water is supplied to the mains from the water tanks or stand pipes.

An object of the present invention is to provide improved means for controlling the amount of water in the water tanks or stand pipes of a water supply system, so that water in the tanks or stand pipes will drain back into the water mains or water pipes of the water supply system when the pressure of the water in the system drops to a predetermined minimum, and to maintain the amount of water in the water tanks or stand pipes at a predetermined maximum elevation under normal conditions, so that water will not overflow from the tanks or stand pipes.

Another object of the invention is to provide an improved fluid control means in which the main valve is under the control of a valve device actuated by a diaphragm, the operation of which diaphragm is under the control of a pressure regulator which is kept active through the action of a predetermined discharge of water.

Another object of the invention is to provide an improved fluid control means in which the main valve is actuated by fluid pressure operated means, the operation of which is effected by a diaphragm operated control valve device, either when the pressure on one side of the main valve drops a predetermined amount, or the pressure on the opposite side of the main valve exceeds a predetermined amount.

Another object of the invention is to provide an improved fluid control apparatus of the character mentioned, which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawing:

Figure 1 is a diagrammatic view, partly in section, of a fluid control apparatus embodying the present invention; and Fig. 2 is an enlarged section of the pressure reducing valve shown in Fig. 1.

Referring to the drawing the main pipe line 11 leads from a suitable source of supply, and the pressure of the fluid in said pipe is normally maintained at a predetermined pressure by means of a suitable pump (not shown). Mounted in the pipe 11 is a main valve 12, which is installed in the pipe 11 at a convenient point adjacent to and beneath a tank, stand pipe, or the like (not shown), as is customary in municipal water supply systems and the like.

The main valve 12 has a rotatable plug 13 having a waterway 14 formed therein.

The plug 13 is adapted to be rotated by any suitable mechanism so as to control the flow of water through the pipe 11. In the present instance the plug operating mechanism is shown as comprising a sector 15 which is fixed to one end of the stem of the valve plug 13 and has teeth in meshing relationship with a rack bar 16.

One end of the rack bar 16 is connected to the end of a rod 18 of a piston 19 mounted in a cylinder 20.

Reciprocation of the piston 19 within the cylinder 20 is adapted to turn the plug 13 through an angle of approximately 90° so as to position the waterway 14 of the plug 13, whereby the flow of water through the pipe 11 is either cut off or permitted.

For the purpose of controlling the operation of the piston 19, a suitable control valve device 21 is provided.

Chamber 22 on one side of piston 19 is connected to chamber 23 of the control valve device 21 by a passage or pipe 24.

Chamber 25 on the opposite side of piston 19 is connected to chamber 26 of the control valve device 21 by a passage or pipe 27.

The control valve device 21 is also formed with a chamber 28, and chambers 23 and 28 of the control valve are connected to a sewer or the like (not shown) by a pipe 29.

Fluid under pressure is supplied to chamber 26 of the control valve device 21 through a pipe 30 which leads from a suitable source of supply. The fluid under pressure thus supplied to chamber 26 is alternately supplied to the chambers 22 and 25, respectively, by means of a pilot valve 31 which is operatively connected to a diaphragm 32 by means of a rod 33.

The diaphragm 32 is mounted in a suitable casing, and chamber 34 on one side of the diaphragm is directly connected to the pipe 11 on the side of the main valve 12 opposite to the side of said valve leading to the water tank or stand pipe, by means of a pipe 35, so that the fluid under pressure in diaphragm chamber 34 will at all times be substantially the same as the pressure of the fluid in the pipe 11 between the valve 12 and the pump or other means that normally maintains the fluid under a predetermined pressure in the pipe 11.

Leading from the pipe 35 is a pipe 36 which is connected to the high pressure side of a pressure reducing valve device 37. The low pressure side of the valve 37 is connected to diaphragm chamber 38 by a pipe 39.

Also connected to pipe 39 between the pressure reducing valve 37 and the diaphragm chamber 38 is a pipe 40 having mounted therein a needle valve 41, the purpose of which will be hereinafter more fully described. Pipe 40 may lead to a sewer or a like free discharge.

On the side of the diaphragm 32 having the low pressure chamber 38 there is an expansible coil spring 42 which acts against one side of of the diaphragm. The pressure of spring 42 is adapted to be adjusted by means of a set screw or other suitable device 43.

The pressure reducing valve device 37 may be of any suitable type whereby the pressure of the fluid supplied to diaphragm chamber 38 will be at a considerably lower pressure than the pressure of the fluid supplied to diaphragm chamber 34. The pressure of the fluid in diaphragm chamber 38 plus the pressure of spring 42 normally equals the pressure of the fluid in diaphragm chamber 34 so that the diaphragm 32 will be normally balanced. Furthermore, the pressure reducing valve device 37 would be very sensitive to changes in pressure of the fluid and maintain the delivery of pressure within close limits.

As shown in Fig. 2, the pressure reducing valve 37 may comprise a body having a bottom plug 44 mounted therein. The plug 44 is formed with a bore 45 in which is mounted one end of a yoke 46. The yoke 46 is formed with a valve disk 47 and a yoke cap 48, said yoke cap being spaced a suitable distance from the valve disk 47.

The yoke cap 48 bears against one side of a diaphragm 49. Acting against the opposite side of the diaphragm 49 is a spring 50, the tension of which is adapted to be adjusted by means of a screw 51.

The body of the pressure reducing valve device 37 is formed with a threaded opening 52 for the reception of one end of pipe 36 which leads from the supply of high pressure fluid.

Formed within the body of the pressure reducing valve device 37 is a valve seat 53 for the valve disk 47. Opening 52 is in communication with valve seat 53 through a port 54.

The pressure reducing valve body 37 is also formed with a chamber 55 which is in communication with a threaded opening 56 to which pipe 39 heretofore referred to is connected.

Normally the valve disk 47 is in spaced relation with the valve seat 53 so that the valve is open, said valve disk being held in such position by spring 50. Supply pressure delivered to the reducing valve through pipe 36 flows through port 54, from which it passes through the gap between valve disk 47 and the valve seat 53 and enters chamber 55 at a reduced pressure. From chamber 55 the fluid under reduced pressure flows through pipe 39 to diaphragm chamber 38.

When the pressure builds up in chamber 55 it raises the diaphragm 49 permitting spring 57 to force the yoke 46, carrying valve disk 47 towards the seat 53 until the disk 47 reaches a point at which it throttles or reduces the initial pressure to the adjusted delivery pressure. In this way fluid under reduced pressure will be constantly supplied to diaphragm chamber 38 through pipe 39.

Since pipe 39 is connected to a sewer by means of pipe 40 the pressure of the fluid thus delivered to diaphragm chamber 38 under reduced pressure will not build up, as there is a constant leakage of fluid from the diaphragm chamber 38 to the sewer. The purpose of needle valve 41 is to control the amount of such leakage of fluid from the diaphragm chamber 38. By adjusting the position of the needle valve 41 excess leakage of fluid from the diaphragm chamber 38 will be prevented, so that the pressure of the fluid within diaphragm chamber 38 plus the pressure of spring 42 will balance the pressure of the fluid in diaphragm chamber 34.

In operation, assuming that the tank is filled with water to the desired elevation and the pressure of the water in the main pipe 11 is up to the desired pressure, the valve plug 13 will be in closed position, as shown in Fig. 1, and said plug will remain in closed position as long as the pressure of the water in pipe 11 remains up.

While the parts of the apparatus are in this position, diaphragm 32 will remain balanced in the manner heretofore described, and there will be a continuous flow of water through the pressure reducing valve device 37 and also through pipe 40, past the needle valve 41.

When the pressure of the water in the section of the pipe 11 between the valve 12 and the pump drops a predetermined amount, a corresponding drop in pressure in diaphragm chamber 34 will also occur, due to the direct connection between chamber 34 and the pipe 11 provided by pipe 35.

As soon as the pressure in chamber 34 drops a predetermined amount, the diaphragm 32 will be unbalanced and therefore, said diaphragm will be moved toward the left, through the action of spring 42.

Movement of the diaphragm 32 towards the left effects a corresponding movement of pilot valve 31, so that said pilot valve is shifted from the full line position, Fig. 1, to the dotted line position.

With the position of the pilot valve thus shifted, piston chamber 25 will be connected to the sewer through pipe 27, chamber 26 and pipe 29, and the piston chamber 22 will be supplied with fluid under pressure from pipe 30, through chamber 23 and pipe 24, thereby moving piston 19 and rack bar 16 toward the left.

Movement of the rack bar 16 toward the left turns the valve plug 13 from closed to open position, thereby establishing communication from the tank to pipe 11, and permitting water in the tank to flow into the pipe 11, thereby supplying additional water to the pipe.

The valve plug 13 will remain in open position until the pressure in diaphragm chamber 34 is increased.

For instance, after the system has operated to open valve plug 13 in the above described manner, the parts will remain in valve open position until the tank has been again filled to a predetermined elevation.

Thus, when the pump forces water through the pipe 11 in the direction towards the left, Fig. 1, the water will be forced upwardly into the tank until the back pressure from the water in the tank increases the pressure of the water in pipe 11 an amount by which the pressure supplied to chamber 34 by pipe 35 overbalances the pressure in chamber 38, and moves the diaphragm back to the position shown in Fig. 1.

With the diaphragm 32 in such position piston chamber 22 will be connected to the sewer through pipe 24, chamber 23 and pipe 29, and piston chamber 25 will be supplied with fluid under pressure from pipe 30, chamber 26, and pipe 27, so that piston 19 is forced from the dotted line position, Fig. 1, to the right hand full line position, thereby closing the valve plug 13.

The primary purpose of the fluid control system embodied in the present invention is to provide an accurate and positive altitude valve control at a moderate cost; fluid control means by which the main control valve 12 will automatically close when the elevation of the water being pumped into a water tank or stand pipe reaches a maximum elevation in order to prevent overflowing of the water in the tank. Another advantage of the present invention is that the main valve 12 is adapted to automatically open and drain water from the tank back into the water system in case the pressure in the system drops to a predetermined minimum.

The adjustment of the pressure reducing valve 37 is such that the pressure is slightly lower than the minimum pressure at which the valve 12 is to open and supply water to the system. Assuming that the distance from the center of the supply header to the maximum elevation in the water tank is 100 feet and that a 5 feet drop is allowable before the valve 12 is to open, the pressure reducing valve 37 should be set at a pressure 10 feet less than the maximum pressure from the center line of the header to the maximum elevation of the tank or stand pipe. Thus, if the diaphragm 32 has an area of 10 square inches, the spring 42 should be designed for a force equal to the pressure produced by 10 feet water differential, which would be the difference between the maximum elevation of the water in the tank and the setting of the pressure reducing valve 37; and, therefore, when the elevation of water in the tank reaches maximum elevation, the spring 42 is compressed, and the diaphragm 32 moved in the closing direction, thereby actuating the pilot valve 31 in the closing direction and effecting closing of the main valve 12, as has been heretofore described.

Upon a drop in pressure in the pipe 11 equal to approximately 5 feet in the tank, the pressure of spring 42 overcomes the combined forces required to actuate the pilot valve 31 and consequently the pilot valve moves in the opening direction, opening the main valve 12.

An altitude valve being in a sense a pressure regulating valve, this fluid control system may also be used for pressure regulating services and does not necessarily have to be applied to tanks, but may be used in pipe lines and other fluid systems requiring a control of the pressure existing at points in the pipe line or the water system.

Having thus described our invention, what we claim is:

1. Fluid controlling apparatus comprising a main line valve, fluid pressure operated means for actuating said valve for opening and closing the same, a control valve for controlling the operation of said main valve operating means, a diaphragm for operating said control valve, means for supplying high pressure fluid to one side of said diaphragm, means for supplying fluid under reduced pressure from the source of high pressure fluid to the opposite side of said diaphragm, and a spring acting on the same side of the diaphragm as the side to which the fluid under reduced pressure is supplied to balance the diaphragm, said control valve being operated by said diaphragm upon a predetermined change in the pressure of the high pressure fluid acting on one side of said diaphragm to effect operation of said main valve.

2. Fluid control means comprising a main line valve, fluid pressure operated means for actuating said valve and including a diaphragm device having a chamber on one side of the diaphragm directly connected to the main line and subject to variations in pressure in the main line, the opposite side of said diaphragm normally balancing the main line pressure side of the diaphragm through the combined pressure of fluid supplied thereto under reduced pressure and a spring, and means for draining a predetermined amount of fluid under reduced pressure supplied to said diaphragm whereby the combined pressures of such reduced pressure and the spring pressure are maintained constant, so that when the main line pressure drops a predetermined amount the diaphragm will be actuated by said spring.

3. The combination with a main valve, a pressure chamber operating to open and close the valve, a pressure operated pilot valve device adapted to regulate the pressure in said chamber to open and close the main valve, means for supplying high pressure fluid to said pilot valve device, means for normally balancing the pressure of the high pressure fluid supplied to said pilot valve device comprising a pressure regulating device for supplying fluid under reduced pressure and a spring, and means for maintaining the reduced pressure supplied to said pilot valve device by said pressure constant whereby upon a predetermined reduction in high pressure supplied to the pilot valve device said pilot valve will be operated by the pressure exerted by the spring.

EUGENE C. BRISBANE.
ROBERT BISCHOFF.